United States Patent
Bliss

[19]

[11] Patent Number: 6,056,341
[45] Date of Patent: May 2, 2000

[54] APPARATUS FOR RELEASING ITEMS WITHIN A CONFINED SPACE

[75] Inventor: George Nelson Bliss, Bloomfield Hills, Mich.

[73] Assignee: Diamond Automations, Inc., Farmington Hills, Mich.

[21] Appl. No.: 09/008,685

[22] Filed: Jan. 16, 1998

[51] Int. Cl.⁷ ........................................................ B66C 1/42
[52] U.S. Cl. .............................................. 294/88; 294/106
[58] Field of Search ............................. 294/88, 106, 107, 294/87.12, 81.61, 67.31, 81.51, 86.41

[56] References Cited

U.S. PATENT DOCUMENTS

| | | | |
|---|---|---|---|
| 3,139,302 | 6/1964 | Orloff et al. | 294/88 |
| 3,306,646 | 2/1967 | Flora, Jr. | 294/81.61 |
| 3,401,974 | 9/1968 | Martelee | 294/88 |
| 3,451,711 | 6/1969 | Carpenter . | |
| 3,608,950 | 9/1971 | Westbrand . | |
| 4,133,570 | 1/1979 | Hammink et al. | 294/110.1 |
| 4,303,269 | 12/1981 | Faughnan . | |
| 4,456,293 | 6/1984 | Panissidi | 294/106 |
| 4,648,646 | 3/1987 | Klüpfel et al. . | |
| 4,709,953 | 12/1987 | Sirota | 294/106 |
| 4,765,487 | 8/1988 | Bliss . | |
| 4,810,019 | 3/1989 | Brucher | 294/106 |
| 5,116,094 | 5/1992 | Jones | 294/81.61 |
| 5,118,248 | 6/1992 | Brucher | 294/86.41 |
| 5,163,727 | 11/1992 | Slezak et al. | 294/81.61 |
| 5,330,242 | 7/1994 | Lucky, Sr. . | |
| 5,338,150 | 8/1994 | Focke et al. . | |
| 5,370,268 | 12/1994 | Adams . | |
| 5,398,983 | 3/1995 | Ahrens . | |
| 5,411,304 | 5/1995 | Muto et al. . | |
| 5,417,464 | 5/1995 | Seaberg et al. . | |
| 5,463,847 | 11/1995 | Alexander et al. . | |
| 5,486,030 | 1/1996 | Cobelo . | |
| 5,536,133 | 7/1996 | Velez et al. . | |
| 5,558,380 | 9/1996 | Meyer et al. . | |
| 5,562,320 | 10/1996 | Bloomberg et al. . | |
| 5,653,489 | 8/1997 | Fandrich et al. | 294/88 |

FOREIGN PATENT DOCUMENTS

| | | | |
|---|---|---|---|
| 0 167 138 | 1/1986 | European Pat. Off. . | |
| 0 666 149 | 8/1995 | European Pat. Off. . | |
| 24 40 199 | 3/1976 | Germany . | |
| 166475 | 6/1961 | U.S.S.R. | 294/106 |
| 0839978 | 6/1981 | U.S.S.R. | 294/81.61 |
| 1110627 | 8/1984 | U.S.S.R. | 294/88 |
| 1615134 | 12/1990 | U.S.S.R. | 294/106 |

*Primary Examiner*—Robert P. Olszewski
*Assistant Examiner*—Paul T. Chin
*Attorney, Agent, or Firm*—Kenyon & Kenyon

[57] ABSTRACT

An automated device for releasing items within a confined space, particularly an automated pickup head which is used to grip egg cartons or trays and place those egg cartons or trays in stacks in a shipping container or basket. The device includes a pickup head which may be mounted on any known or conventional apparatus for moving and orienting the pickup head to grasp individual items such as, e.g., egg cartons or trays and to transfer those items to, and insert those items within, a confined space such as, e.g., a shipping container or basket. Mounted on the pickup head is an actuation device such as, e.g., two air cylinders, each having one end connected to the pickup head and another end connected to a first link. The first links are pivotally mounted on the pickup head, and are pivotally attached at one end to an upper end of a gripping finger. A biasing element biases the gripping fingers to an open position. An intermediate portion of each gripping finger is pivotally and slidably attached to a second link. The second links are pivotally mounted on the pickup head. The lower end of the gripping fingers are preferably slightly curved, and are used to grip the side and bottom of the items to be inserted and/or removed within the confined space.

27 Claims, 4 Drawing Sheets

APPARATUS FOR RELEASING ITEMS WITHIN A CONFINED SPACE

BACKGROUND OF THE INVENTION

1. Field of the Invention

The present invention relates to an automated device for releasing items within a confined space. In particular, the present invention relates to an automated pickup head which is used to grip egg cartons or trays and place those egg cartons or trays in stacks in a shipping container or basket.

2. Description of the Prior Art

Several prior art devices are designed to allow the gripping or release of items within a confined space or insertion of egg cartons within a confined shipping container.

U.S. Pat. No. 4,765,487 to George N. Bliss assigned to Diamond Automations, Inc. shows an apparatus which includes a device for inserting a stack of egg cartons within a shipping container. In that patent, a plastic strip is wrapped around a stack of egg cartons and used to insert the stack into the shipping container. Thereafter, the plastic slip is withdrawn from the shipping container by releasing one end of the strip and pulling the other end around the stack and out of the shipping container.

U.S. Pat. No. 4,648,646 assigned to Möllers Maschinenfabrik GmbH shows a device for releasing items such as cement bags in a confined space between similar bags. In the device of that invention, gripping arms are mounted on rollers which roll within guide rails on the device.

U.S. Pat. No. 5,338,150, assigned to Focke & Co. shows a device for palletizing cartons. The device includes carrying arms with carrying legs which pivot from a vertical to a horizontal position under the action of short stroke cylinders, while the gripping arms are moved by another set of cylinders.

U.S. Pat. No. 5,463,847, assigned to FPS Food Processing Systems, Inc. describes an automated device designed to grip egg cartons and insert those egg cartons into a shipping container having a minimum of spacing between the inside walls of the shipping container and the egg cartons. The device of that patent uses two retractable "wings" on the pickup head, in conjunction with two curved arms which move along guide wheels. Operation of the apparatus of U.S. Pat. No. 5,463,847 requires the control and use of four hydraulic cylinders.

SUMMARY OF THE INVENTION

Eggs are often packaged and sold in rectangular cartons containing a dozen or a dozen-and-a-half eggs (e.g., two or three rows of six eggs), which egg cartons are manufactured of a lightweight material such as polystyrene or cardboard. Eggs are also often shipped or processed using a generally square egg tray containing two-and-a-half dozen eggs (e.g., five rows of six eggs), which egg trays are generally manufactured of a pulp material or plastic. During a process of grading eggs at an egg farm or an egg processing plant, eggs are generally segregated according to, inter alia, size and condition, and are thereafter packed into the above-described egg cartons or trays. Usually, the egg cartons or trays are then stacked within larger shipping containers or wire plastic baskets for later transportation to a retail outlet. Because eggs are a fragile commodity, and because the egg cartons or trays into which eggs are shipped or processed are not particularly strong, it is necessary for the egg cartons or trays stacked in a shipping container or basket to be fairly tightly packed. Tight packing of egg cartons or trays in a shipping container or basket ensures minimum movement of the eggs and egg cartons or trays within the shipping container or basket, thereby reducing the chance of egg breakage during transportation.

Tight packing of egg cartons or trays within a shipping container or basket is generally accomplished using a shipping container or basket having very little clearance between the inside walls of the shipping container or basket and the outside edges of egg cartons or trays stacked therein. This small clearance can make gentle packing of egg cartons or trays, particularly those egg cartons or trays in the bottom of the shipping container or basket, difficult. Careful hand packing of the shipping containers or baskets can ensure gentle packing of egg cartons or trays within a shipping container or basket. However, hand packing of shipping containers or baskets reduces the speed at which the shipping containers or baskets may be packed, increases labor costs, and can result in repetitive motion injuries to the individuals doing the packing. It is therefore desirable to automate the process of packing shipping containers or baskets with egg cartons or trays. The limited clearance between the outside edges of egg cartons or trays being packed and the inside walls of the shipping container or basket severely limits the amount of space available for an automatic packing device to operate, presenting limitations on the design and operation of any automated packing apparatus. In particular, the limited clearance confines the dimensions of the packing device, which must be capable of being inserted within the interior of the shipping container or basket so as to prevent the need to drop cartons or trays into the bottom of the shipping container or basket. Furthermore, the limited clearance also confines the movement of the gripping structure on the packing device because the gripping structure must open to release the egg cartons or trays in the limited clearance between the outside edges of the egg cartons or trays and the inside walls of the shipping container or basket.

The present invention is a device which allows the automatic gripping of items such as, e.g., egg cartons or trays, and the insertion of those items into a confined space such as a shipping container or basket. The device includes a linkage system which allows the entire pickup head to be inserted into a confined space and thereafter the gripping fingers to be retracted from the gripped item. As few as one and a maximum of two actuating devices are needed to grip and release items using the device of the present invention. The device of the present invention therefore provides cost advantages over the prior art, such as the device shown in U.S. Pat. No. 5,463,847.

The present invention includes a pickup head which may be mounted on any known or conventional apparatus for moving and orienting the pickup head to grasp individual items such as, e.g., egg cartons or trays and to transfer those items to, and insert those items within, a confined space such as, e.g., a shipping container or basket. Mounted on the pickup head is an actuation device such as, e.g., two air cylinders, each cylinder having one end connected to the pickup head and another end connected to a first link. The first links are pivotally mounted on the pickup head, and are pivotally attached at one end to an upper end of a gripping finger. A biasing element such as, e.g., a torsional spring, at each pivotal attachment of the first link and the gripping finger biases the finger away from the pickup head toward a fully open position. An intermediate portion of each gripping finger is pivotally and slidably attached to a second link. The second links are pivotally mounted on the pickup head. The lower end of the gripping fingers are preferably slightly curved, and are used to grip the side and bottom of the items to be inserted and/or removed within the confined space.

In operation of present invention, the pickup head is moved to a position above, and aligned with, the group of items to be inserted into the confined space. The actuation devices are retracted to their fully retracted positions, so that ends of gripping fingers are in their widest-apart position. The pin on the finger sliding in the slot in the second link is at its outwardmost position in the slot, due to the biasing force applied by the biasing element. Thereafter, pickup head is lowered to a position adjacent the group of items to be gripped. The actuation devices are moved to their fully extended positions. Extension of the actuation devices causes the first links to rotate outwardly around pin connections, causing downward movement of the gripping fingers as well as inward movement of the gripping finger ends as the result of the restraint imposed by second links. In the fully extended position of the actuation devices, the curved ends of the gripping fingers extend underneath the items to thereby support the items vertically and horizontally.

The pickup head is then moved to a position above the shipping container or basket to be filled, and thereafter lowered. The items are lowered until they are placed on top of a previous layer of items, or in the case of the first layer of items, until they are placed on the bottom of the shipping container or basket. After the items are lowered to their desired position, the actuating devices are retracted. Retraction of the retraction devices causes the first links to pivot inwardly, drawing the upper ends of gripping fingers upwardly and outwardly. The pins slide inwardly in the slots on second links as the second links pivot inwardly, as the result of contact of the gripping fingers with the inner wall of the shipping container or basket. This contact overcomes the bias of the biasing elements which normally bias the gripping fingers outwardly. After the actuating devices reach their fully retracted position, the ends of the gripping fingers are no longer under the items, and the pickup head may be lifted, while leaving the items within the shipping container or basket.

DETAILED DESCRIPTION OF THE INVENTION

Figure 1:
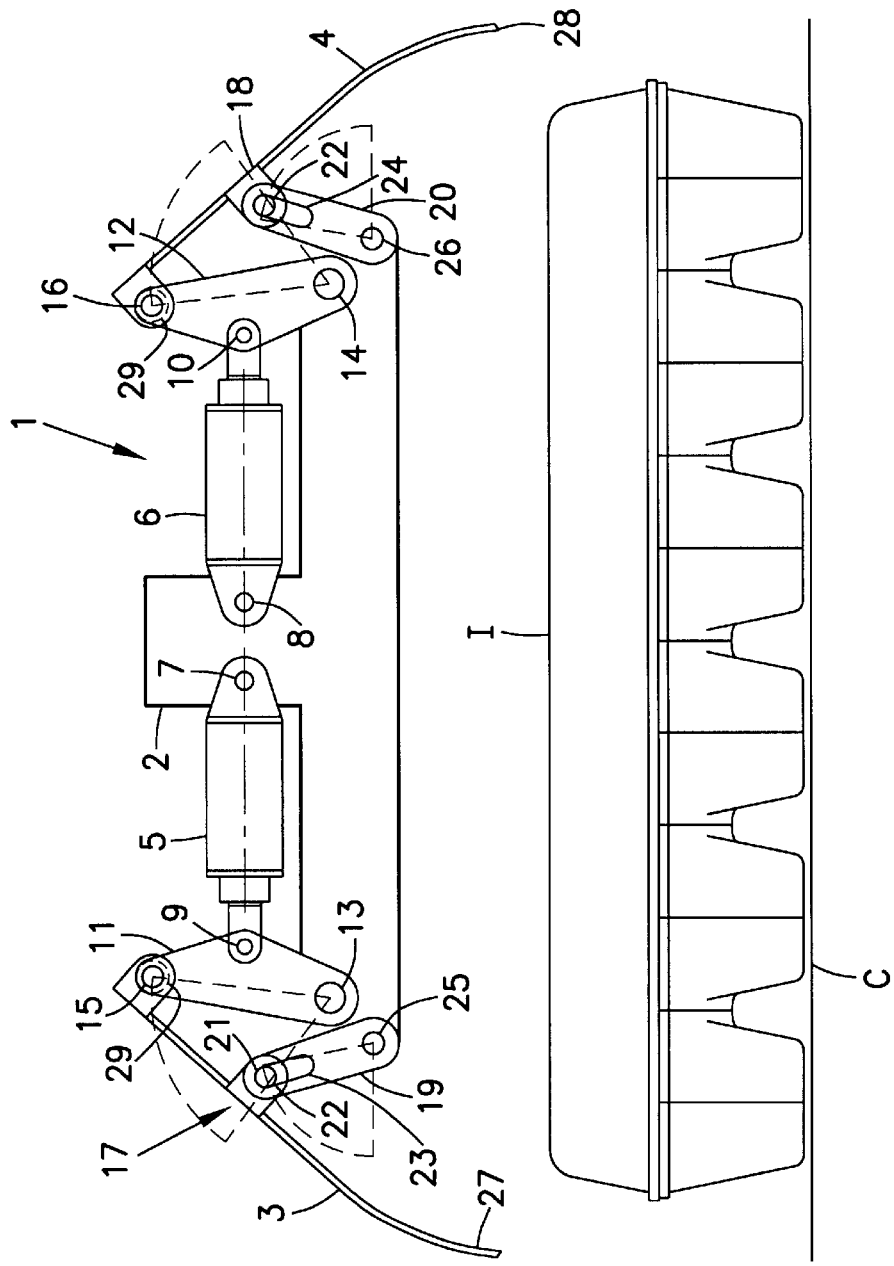
FIG. 1 is a side view of the device of the present invention, in an open position before an item is gripped.

FIG. 1 is a side view of the device 1 of the present invention, in an open position before an item I is gripped. Device 1, in a preferred embodiment, can be used to lift items I such as egg cartons or trays from, e.g., a conveyor C, and to insert the egg cartons or trays into a confined space S (FIGS. 3 and 4) such as the interior of a shipping container or basket. Device 1 can include a pickup head 2 which is normally connected to an automated device (not shown) for moving and orienting the pickup head 2 according to one or more degrees of freedom, including vertical and horizontal movement and rotation. In the position shown in FIG. 1, the gripping fingers 3, 4 of device 1 are in an open position, prior to lowering of pickup head 2 toward the item I to be gripped and closing of the gripping fingers 3, 4 around the item I. In the open position, an actuation device such as, e.g., two air cylinders 5, 6, is in its fully retracted position. In order to grip the item I, the pickup head 1 is lowered from the position in FIG. 1 to the position in FIG. 2, wherein the pickup head 2 is adjacent the item I. Pickup head 2 is lowered using the automated device (not shown) described above, which moves the pickup head 2 vertically downward toward item I.

Figure 2:
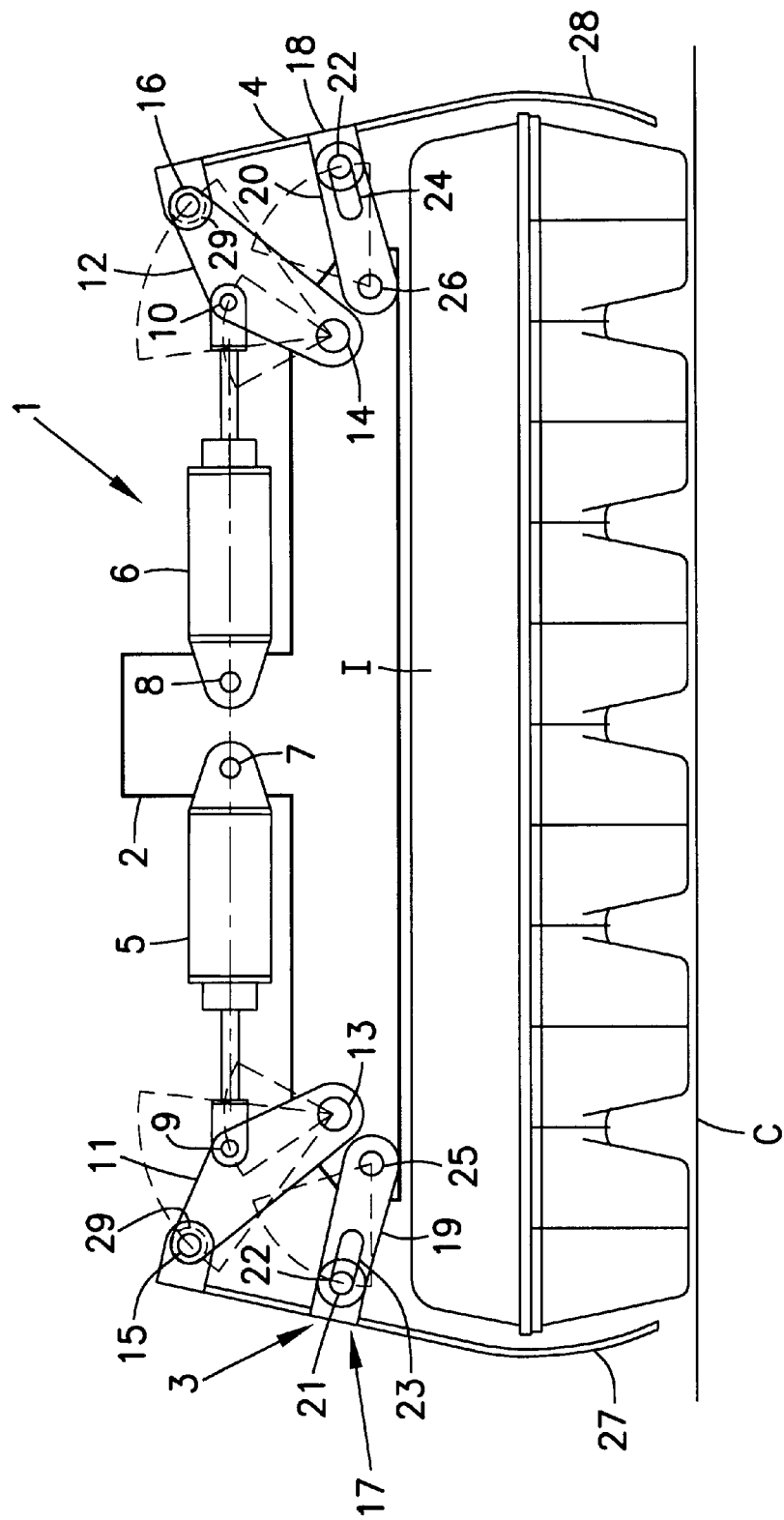
FIG. 2 is a side view of the device of the present invention, in a partially-closed position during gripping of an item.

The actuation device is shown in FIGS. 1–4 as two air cylinders 5, 6, but could be any known device for pivoting links 11, 12 about pin connections 13, 14 such as, inter alia, one or more solenoids, linear or rotary motors, etc. In the preferred embodiment, the cylinders 5, 6 are pivotally mounted at one end to pickup head 2 using suitable pin connections 7, 8. The other end of cylinders 5, 6 are connected, using suitable pin connections 9, 10, to first links 11, 12. First links 11, 12 are pivotally mounted at one end to pickup head 2 using suitable pin connections 13, 14. Another end of first links 11, 12 is pivotally connected, using suitable pin connections 15, 16, to one end of gripping fingers 3, 4. A biasing element 29, such as a torsional spring acting against both first links 11, 12 and the associated ends of gripping fingers 3, 4, acts to normally bias gripping fingers 3, 4 outward, to a fully open position (FIGS. 1 and 2). Intermediate portions 17, 18 of gripping fingers 3, 4, are pivotally and slidably connected to second links 19, 20. Pins 21, 22 mounted on intermediate portions 17, 18 slide in slots 23, 24 in one end of second links 19, 20, and also allow relative rotation between second links 19, 20 and gripping fingers 3, 4. The biasing devices 29 normally bias the gripping fingers 3, 4 so that pins 21, 22 are at the outermost end of slots 23, 24 (FIGS. 1 and 2). Second links 19, 20 are pivotally mounted on pickup head 2 using suitable pin connections 25, 26.

Gripping fingers 3, 4 are preferably constructed of a material such as, e.g., stainless steel, and are relatively thin to allow their insertion and removal within the limited space between the outer edges of the items I to be gripped and the inner walls W of the space S in which the items I are inserted. A lower end 27, 28 of gripping fingers 3, 4 is preferably slightly curved. The slight curvature of lower ends 27, 28 allows them to project under the items I to be gripped, thereby supporting the items I for lifting and insertion. Gripping fingers 3, 4 can be made to have a width greater than the width of the items I to be gripped, such that multiple items I can be gripped simultaneously. For example, the standard shipping container or basket for egg cartons or trays holds a stack of egg cartons or trays which is three dozen-egg cartons wide (see FIG. 4), two dozen-and-a-half-egg cartons wide, and one two-and-a-half-dozen-egg trays wide. The width (into the paper in FIGS. 1–4) of the gripping fingers 3, 4 can therefore be equal to, or slightly less than, the width of three side-by-side dozen-egg cartons. The device 1 therefore may grip three dozen-egg cartons, two dozen-and-a-half-egg cartons, or one two-and-a-half-dozen-egg tray each time, thereby filling an entire layer in the shipping container or basket each time the device 1 is inserted into the shipping container or basket. The pickup head 2 is preferably rotated 90° for each layer of egg cartons or trays inserted in the shipping container or basket. This arrangement of egg cartons or trays (shown in FIG. 4), increases the stability of the stacked egg cartons or trays within the shipping container or basket.

Operation of the device 1 of the preferred embodiment of the present invention is as follows. A group of items I such as egg cartons or trays are conveyed down a conveyor C to a pickup location. The pickup head 2 is moved to a position above, and aligned with, the group of items I, as shown in FIG. 1. This movement is accomplished by any known or conventional apparatus (not shown) for horizontally, vertically, and rotationally moving the pickup head 2. If not accomplished already, a controller (not shown) for the device 1 operates to retract the cylinders 5, 6 to their fully retracted position (FIG. 1). In this fully retracted position, ends 27, 28 of gripping fingers 3, 4 are in their widest-apart position, and pins 21, 22 are biased by biasing devices 29 to the outward end of slots 23, 24. Thereafter, pickup head 2 is lowered to a position (FIG. 2) adjacent the group of items I to be gripped. The controller (not shown) thereafter activates the cylinders 5, 6 to their fully extended positions. Extension of cylinders 5, 6 causes first links 11, 12 to rotate outwardly around pin connections 13, 14. Outward rotation of first links 11, 12 results in downward movement of gripping fingers 3, 4, as well as inward movement of gripping finger ends 27, 28 as the result of the restraint imposed by second links 19, 20. In the fully extended position of cylinders 5, 6 (FIG. 3), curved ends 27, 28 of gripping fingers 3, 4 extend underneath items I to thereby support items I vertically and horizontally. In this position, pins 21, 22 continue to be biased by biasing devices 29 to the outward end of slots 23, 24.

Figure 3:
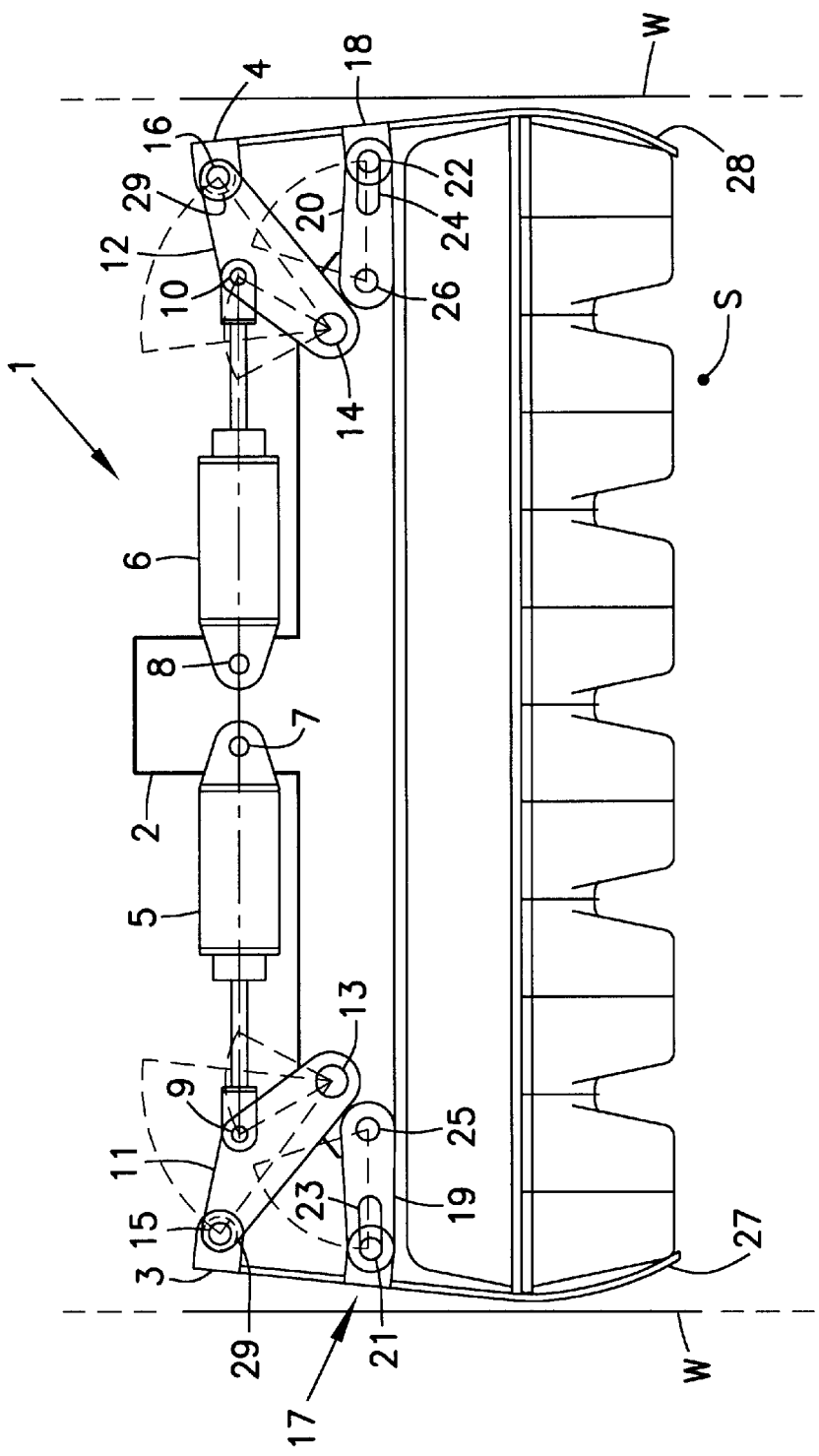
FIG. 3 is a side view of the device of the present invention, in a fully-closed position during insertion of an item into a confined space.
Figure 4:
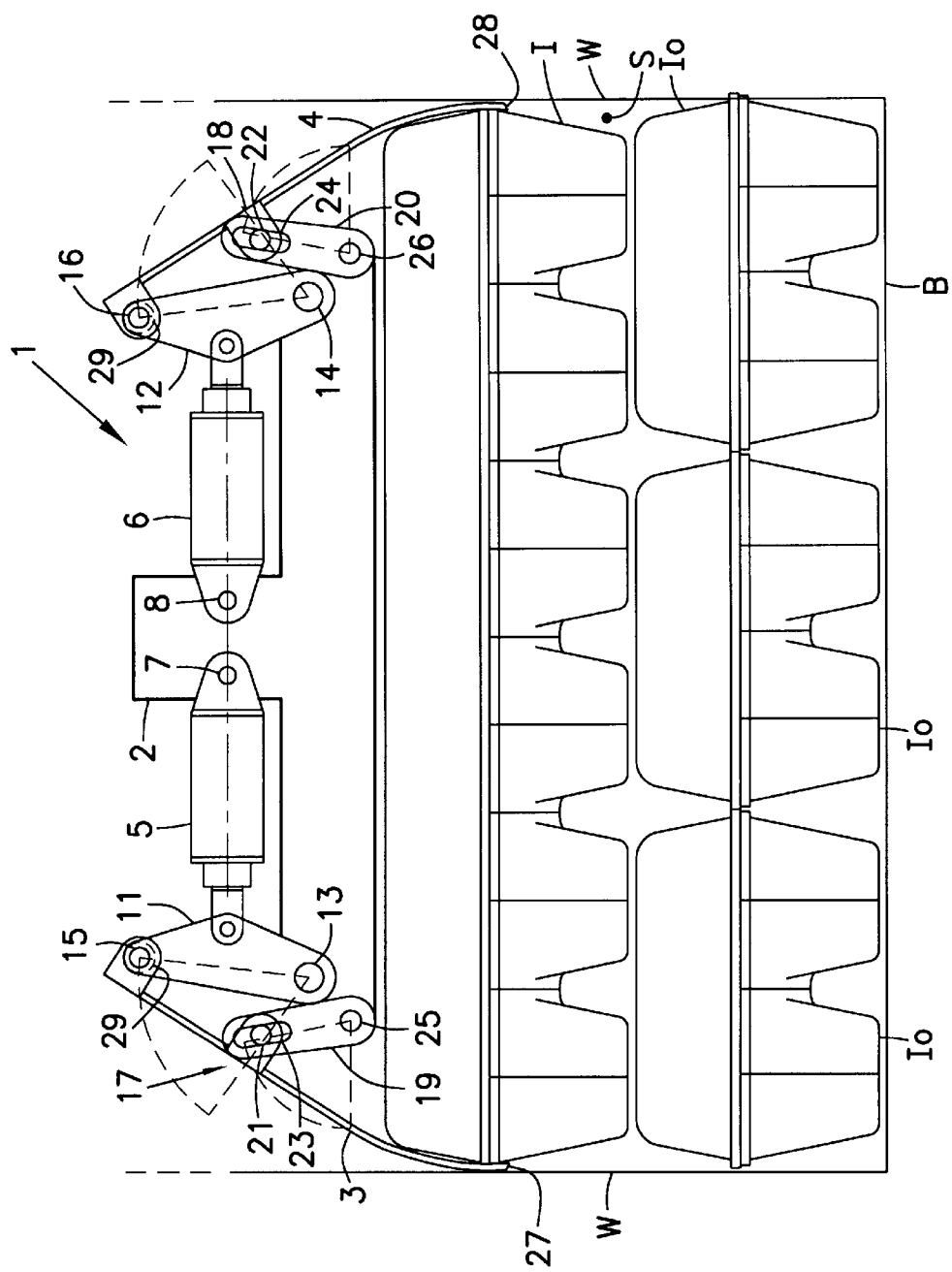
FIG. 4 is a side view of the device of the present invention, in a partially retracted position in a confined space.

Pickup head is then moved to a position above the shipping container or basket to be filled, and on alternating layers is rotated by 90°. The device 1 is centered over the space S to be filled, and the pickup head 2 is thereafter lowered using a conventional or known apparatus (not shown) for effecting vertical movement. Because the outside surfaces of the gripping fingers 3, 4 are the furthest lateral extent of the device 1, the device 1 can be lowered completely within the inside walls W of the shipping container or basket (FIGS. 3 and 4). The items I are lowered until they are placed on top of a previous layer of items I$_o$, or in the case of the first layer of items I, until they are placed on the bottom B of the shipping container or basket.

After the items I held by the device 1 are lowered to their desired position, the controller (not shown) controls the air cylinders 5, 6 to cause them to retract. Retraction of the air cylinders 5, 6 causes the first links 11, 12 to pivot inwardly, drawing the upper ends of gripping fingers 3, 4 upwardly and outwardly. Pins 21, 22 slide inwardly in slots 23, 24 as second links 19, 20 pivot inwardly, due to contact of ends 27, 28 with walls W. This contact, and the resulting force on the ends 27, 28, overcomes the bias of biasing elements 29, resulting in sliding movement of ends 27, 28 of gripping fingers 3, 4 along the outside edges of the items I (compare FIGS. 3 and 4). Outward movement of the gripping fingers 3, 4 during retraction is restrained by contact with walls W and compensated for by sliding of pins 21, 22 in slots 23, 24. The sliding motion of gripping fingers 3, 4 does not interfere with release of the items I within the shipping container or basket. After the air cylinder 5, 6 reach their fully retracted position (FIG. 4), the ends 27, 28 of gripping fingers 3, 4 are no longer under the items I, and the pickup head 2 may be lifted, while leaving the items I within the shipping container or basket. When the ends 27, 28 of gripping fingers 3, 4 clear the upper end of walls W during lifting of pickup head 2, the biasing force of biasing elements 29 cause the pins 21, 22 to snap outwardly in slots 23, 24, so that the device 1 assumes the position shown in FIG. 1.

The present invention contemplates a number of different variations on the above-described preferred embodiments. For example, the present invention need not be used for releasing egg cartons or trays within a shipping container or basket, but can be used to grip and release any item for which such action is accomplished within a confined space. In addition, the device of the present invention could be used for removing items from a confined space. As will be understood by one of ordinary skill in the art, using the device of the present invention to remove items will require merely reversing the sequence of operation described above, with the additional step of slightly closing the gripping fingers before insertion into the confined space, with later opening of the gripping fingers so that the ends of the gripping fingers contact the walls of the confined space. It is to be understood that the above description is only of one preferred embodiment, and that the scope of the invention is to be measured by the claims as set forth below.

I claim:

1. An apparatus for gripping and releasing items comprising:
   a pickup head;
   a plurality of gripping fingers;
   a plurality of first links, each first link being movably mounted on the pickup head and each first link being movably connected to one of the gripping fingers;
   a plurality of second links, each second link being movably mounted on the pickup head and each second link being pivotally and slidably connected to one of the gripping fingers; and
   at least one actuation device, the at least actuation device being coupled to the gripping fingers, the actuation device moving the gripping fingers from an open to a closed position.

2. The apparatus of claim 1, further comprising:
   a plurality of biasing devices, each biasing device being connected to one of the gripping fingers, each biasing device biasing one of the gripping fingers to the open position.

3. The apparatus of claim 1, further comprising a plurality of biasing devices, each biasing device being connected to one of the gripping fingers, each biasing device biasing one of the gripping fingers to an open position wherein the biasing devices are torsional springs and the first links are pivotally connected to the gripping fingers by a pin connection, and wherein the torsional springs are connected to the first links.

4. The apparatus of claim 1, wherein:
   the first links are pivotally connected to the gripping fingers by a pin connection.

5. The apparatus of claim 1, wherein:
   the first links are pivotally connected to the pickup head by a pin connection.

6. The apparatus of claim 1, wherein:
   the second links are pivotally connected to the pickup head by a pin connection.

7. The apparatus of claim 1, wherein:
   the second links are pivotally and slidably connected to the gripping fingers by a pin-slot connection.

8. The apparatus of claim 1, wherein:
   one end of the gripping fingers is curved.

9. The apparatus of claim 1, wherein:
   the actuation device comprises two air cylinders.

10. The apparatus of claim 9, wherein:
    the air cylinders are pivotally connected to the pickup head by pin connections.

11. The apparatus of claim 9, wherein:

the air cylinders are pivotally connected to the first links by pin connections.

12. An apparatus for gripping and releasing items comprising:

a pickup head;

a plurality of gripping fingers;

a plurality of first links, each first link being movably mounted on the pickup head and each first link being movably connected to one of the gripping fingers;

a plurality of second links, each second link being movably mounted on the pickup head and each second link movably connected to one of the gripping fingers;

a plurality of biasing devices, each biasing device being connected to one of the gripping fingers, each biasing device biasing one of the gripping fingers to an open position; and at least one actuation device, the actuation device being coupled to the gripping fingers, the actuation device moving the gripping fingers from the open position to a closed position.

13. The apparatus of claim 12, wherein:

the first links are pivotally connected to the gripping fingers by a pin connection.

14. The apparatus of claim 12, wherein:

the first links are pivotally connected to the pickup head by a pin connection.

15. The apparatus of claim 12, wherein:

the second links are pivotally connected to the pickup head by a pin connection.

16. The apparatus of claim 12, further comprising:

the second links are pivotally and slidably connected to the gripping fingers.

17. The apparatus of claim 16, wherein:

the second links are pivotally and slidably connected to the gripping fingers by a pin-slot connection.

18. The apparatus of claim 12, wherein:

one end of the gripping fingers is curved.

19. The apparatus of claim 12, wherein:

the actuation device comprises two air cylinders.

20. The apparatus of claim 19, wherein:

the air cylinders are pivotally connected to the pickup head by pin connections.

21. The apparatus of claim 19, wherein:

the air cylinders are pivotally connected to the first links by pin connections.

22. The apparatus of claim 12, wherein the gripping fingers are shaped so that, when in the closed position, a lower end of each gripping finger projects under and supports a bottom surface of an item to be gripped.

23. The apparatus of claim 12, wherein, when moving from the closed to the open position in a space insufficiently wide to allow at least one of the gripping fingers to completely move to the open position, the biasing device corresponding to the at least one gripping finger maintains the at least one gripping finger in a position as far from the closed position as is possible in the space.

24. An apparatus for stacking egg cartons or trays in a shipping container or basket comprising:

a pickup head;

a plurality of gripping fingers;

a plurality of first links, each first link being movably mounted on the pickup head and each first link being movably connected to one of the gripping fingers;

a plurality of second links, each second link being movably mounted on the pickup head and each second link being pivotally and slidably connected to one of the gripping fingers;

at least one actuation device, the actuation device being coupled to the gripping fingers, the actuation device moving the gripping fingers from an open to a closed position; and a plurality of biasing devices, each biasing device being connected to one of the gripping fingers, each biasing device biasing one of the gripping fingers to the open position.

25. An apparatus for gripping and releasing items comprising:

a pickup head;

a plurality of gripping fingers;

a plurality of first links, each first link being movably connected to the pickup head and each first link being movably connected to one of the gripping fingers;

a plurality of second links, each second link being movably connected to the pickup head and each second link being pivotally and slidably connected to one of the gripping fingers;

at least one actuation device, the at least actuation device being coupled to the gripping fingers, the actuation device moving the gripping fingers from an open to a closed position; and a plurality of biasing devices, each biasing device being connected to one of the gripping fingers, each biasing device biasing one of the gripping fingers to the open position, wherein the biasing devices are torsional springs.

26. An apparatus for gripping and releasing items comprising:

a pickup head;

a plurality of gripping fingers;

a plurality of first links, each first link being movably connected to the pickup head and each first link being movably connected to one of the gripping fingers;

a plurality of second links, each second link being movably connected to the pickup head and each second link movably connected to one of the gripping fingers;

a plurality of biasing devices, each biasing device being connected to one of the gripping fingers, each biasing device biasing one of the gripping fingers to an open position, wherein the biasing devices are torsional springs; and at least one actuation device, the actuation device being coupled to the gripping fingers, the actuation device moving the gripping fingers from the open position to a closed position.

27. The apparatus of claim 26, wherein:

the first links are pivotally connected to the gripping fingers by a pin connection, and wherein the torsional springs are connected to the first links.

* * * * *